United States Patent Office.

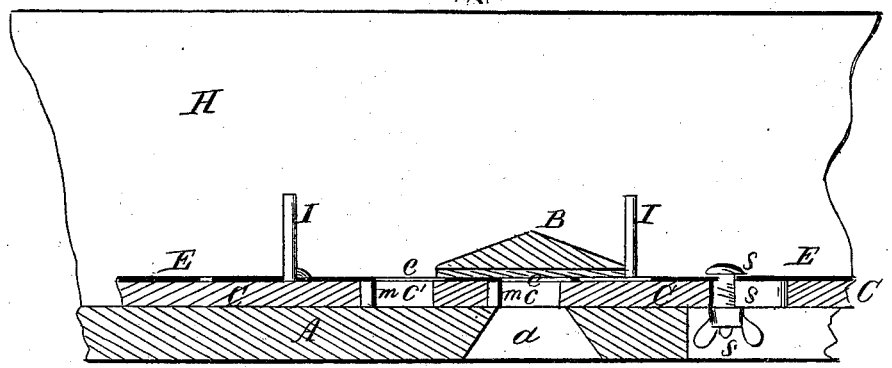
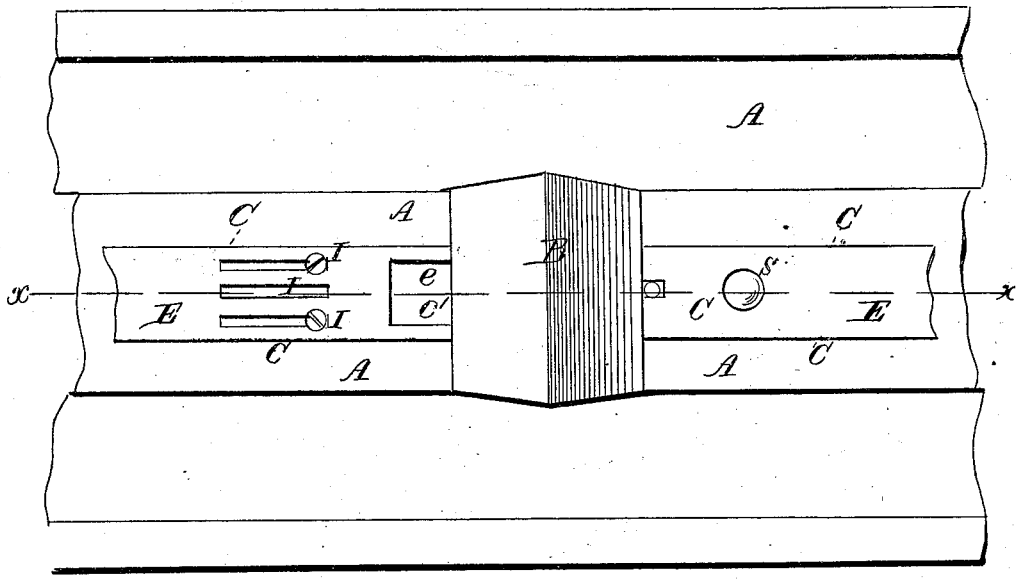

H. B. QUICK, OF HORICON, WISCONSIN, ASSIGNOR TO HIMSELF AND HIRAM BARBER, OF SAME PLACE.

Letters Patent No. 93,554, dated August 10, 1869.

IMPROVEMENT IN DEVICE FOR REGULATING THE FEED IN SEEDING-MACHINE.

The Schedule referred to in these Letters Patent and making part of the same.

*To all whom it may concern:*

Be it known that I, H. B. QUICK, of Horicon, in the county of Dodge, and State of Wisconsin, have invented a new and improved Measuring-Device for Seeding-Machines; and I do hereby declare that the following is a full, clear, and exact description of the construction and operation of the same, reference being had to the accompanying drawings, making a part of this specification, in which—

Figure 1 is a section, through line $x\,x$ of fig. 2.

Figure 2 is a top view.

The object of this invention is to produce, for public use, a new and improved device for effecting the escape of the seed from the seed-box in a uniform and certain manner, such device being so adjustable that the quantity of seed sown shall be entirely under the control of the attendant, who can vary it at pleasure.

In the drawings—

A represents the bottom of the seed-box, provided with a series of apertures, $a\,a$, through which the seed escapes to the ground.

Over each aperture is a bridge, B, having a sharp roof, which slopes toward each end of the box, so as not to obstruct the free passage of the seed to the slide hereinafter described.

All the openings, and all the bridges are, of course, in line.

C is a reciprocating slide, operated by suitable machinery, of any kind, by power obtained from the draught-wheels, or from any other source, and passing under the bridges B B, its function being to alternately cover and uncover the apertures $a\,a$, and to receive at each movement small quantities of the grain at the edge of the bridge, and convey said grain in under the bridge, and drop it through the opening $a$.

To adapt it to this purpose, it is provided with one or two openings, $c\,c'$, which, when over the solid part of the bottom A, outside of the bridge, act as boxes to receive the grain, but when, by the vibration of the board C, they are brought over the opening $a$, drop the grain, and return or come out on the other side of the bridge empty, again to be filled, and again to be emptied, in the same manner.

For the purpose of regulating the feed of the grain into these boxes $c\,c'$, &c., a slide, E, is attached to the upper side of the part C, and made so as to be capable of adjustment longitudinally, by a slot and set-screw, $s\,s'$, or by other suitable means.

The slide E is provided with openings $e\,e$, corresponding to those in the slide C, and it is also provided with a flange, $m$, extending across the whole width, and down the whole depth of the boxes $c\,c'$.

As the slide E is adjusted along, the flange $r$ moves along with it, and operates as a movable wall to the feed-boxes $c\,c'$, enlarging or diminishing their capacity just in proportion as it is advanced or retracted.

It will be observed, from a glance at fig. 1, that by moving the part E further to the right, the feed-openings $e\,e$ would be diminished in size, and the capacity of the boxes $c\,c'$ would be also diminished, so that with the same velocity of movement, and the same quantity of grain in the seed-box H, the feed from the seed-box to the ground would be decreased, and that by moving the part E to the left, the opposite result would be effected.

I I are pins, which serve as agitators and as guides to hold the slide E in position. Any other device that will answer as well may be substituted therefor.

Having thus described my invention,

What I claim as new, and desire to secure by Letters Patent, is—

The arrangement of the guide-pins and agitators I I, in connection with the slots in the metal-strip E, and the reciprocating board C, substantially as and for the purpose specified.

H. B. QUICK.

Witnesses:
HIRAM BARTON,
J. F. RANDOLPH.